Figure 1:
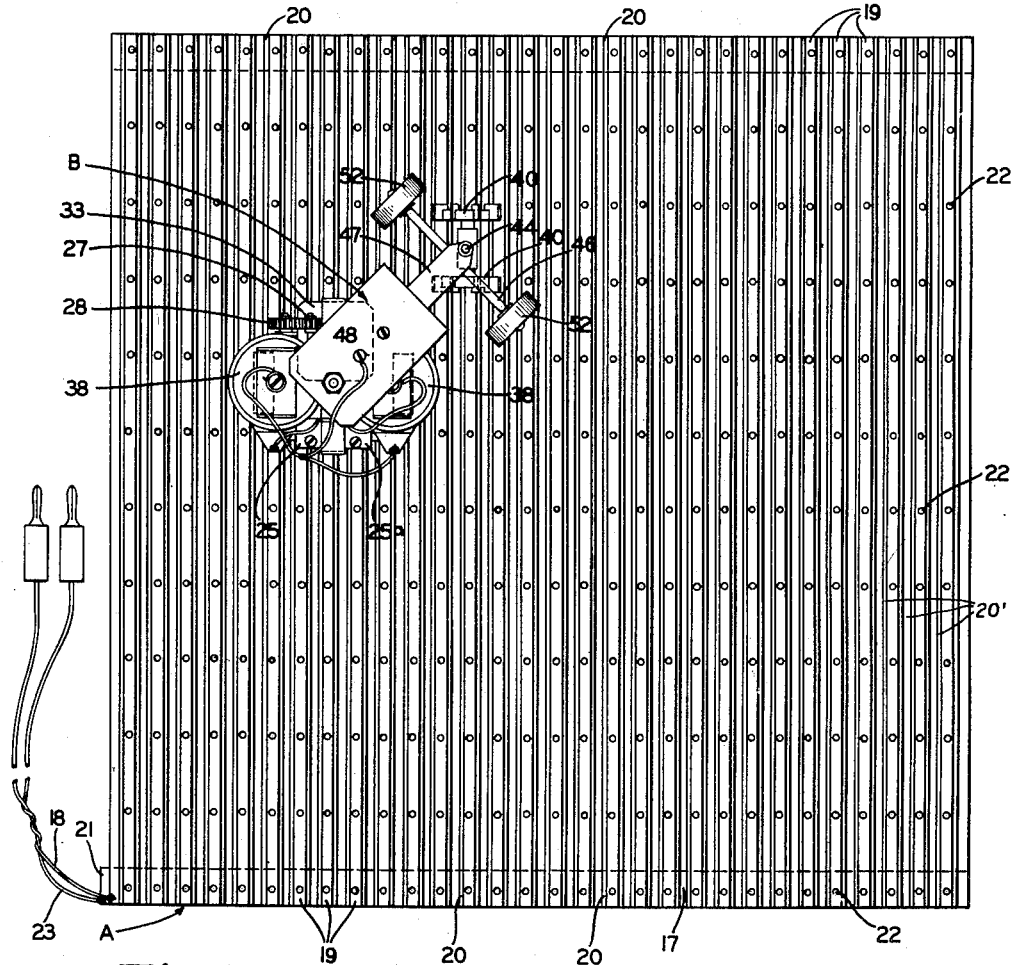

Oct. 30, 1956 A. SHOTWELL 2,768,697
REMOTELY CONTROLLED ELECTRICALLY PROPELLED VEHICLE
Filed May 20, 1953 3 Sheets-Sheet 1

INVENTOR.
Allen Shotwell
BY
Frease & Bishop
ATTORNEYS

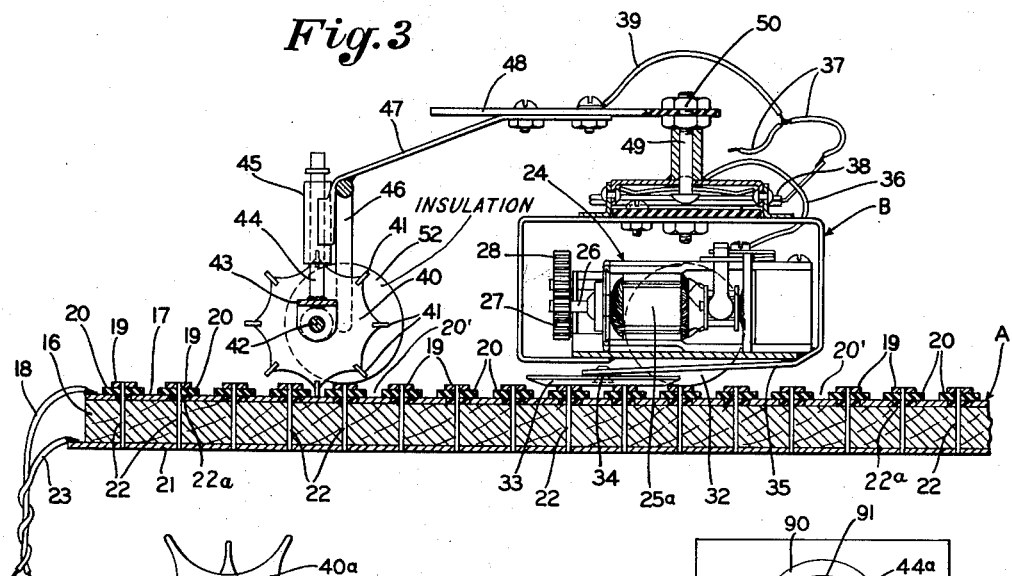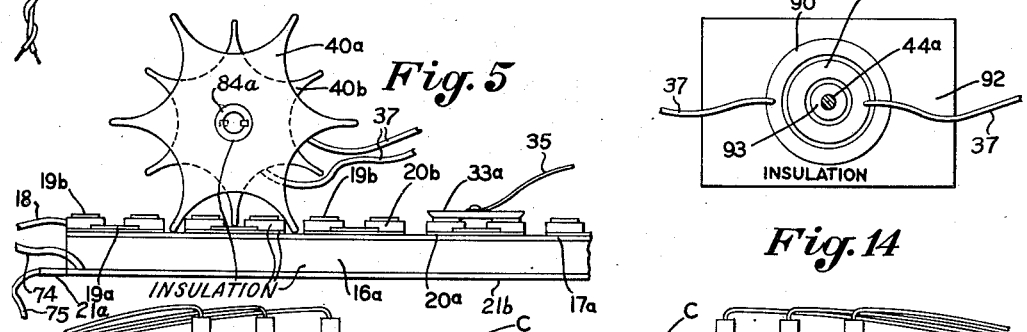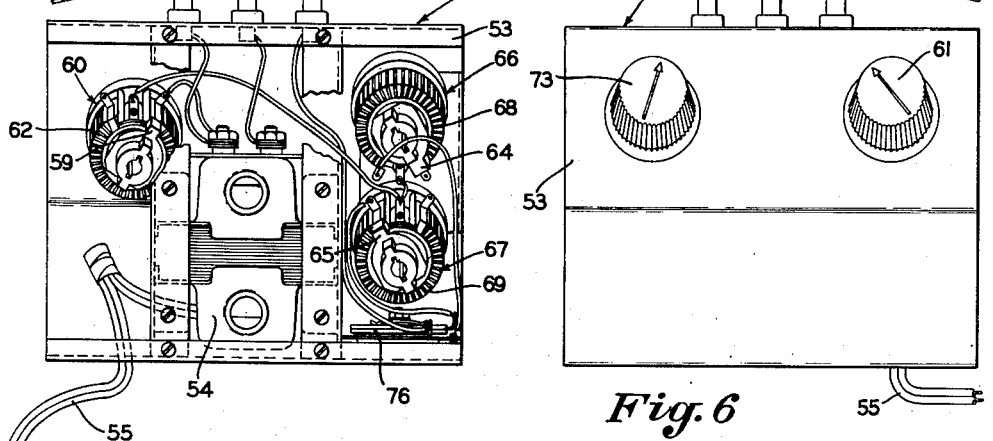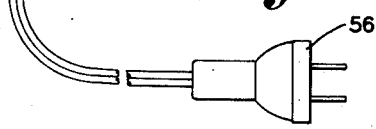

Oct. 30, 1956     A. SHOTWELL     2,768,697
REMOTELY CONTROLLED ELECTRICALLY PROPELLED VEHICLE
Filed May 20, 1953     3 Sheets-Sheet 3
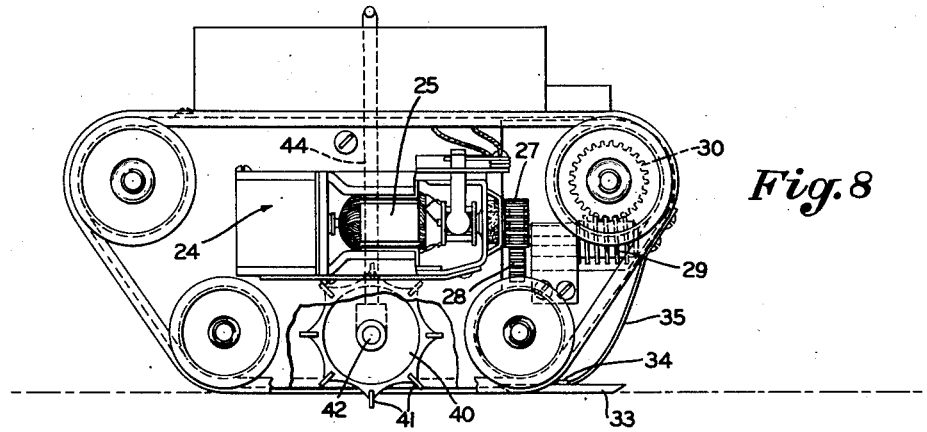
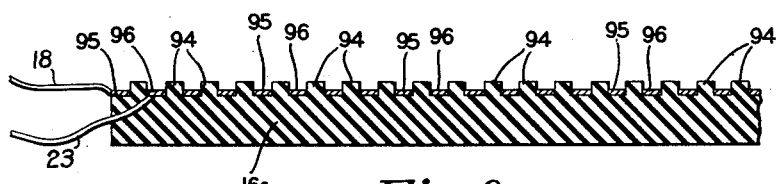
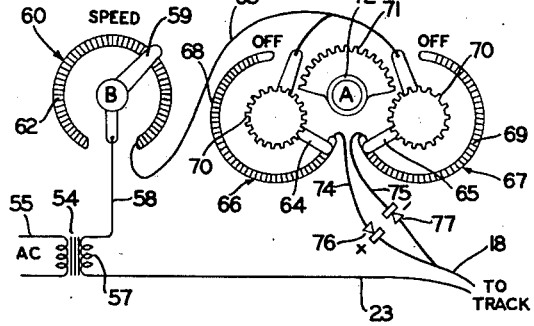
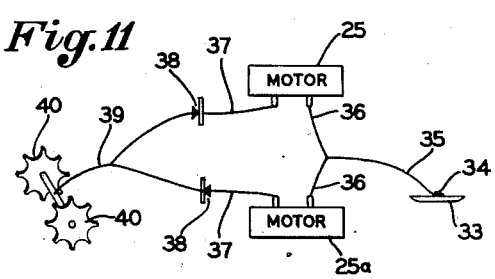
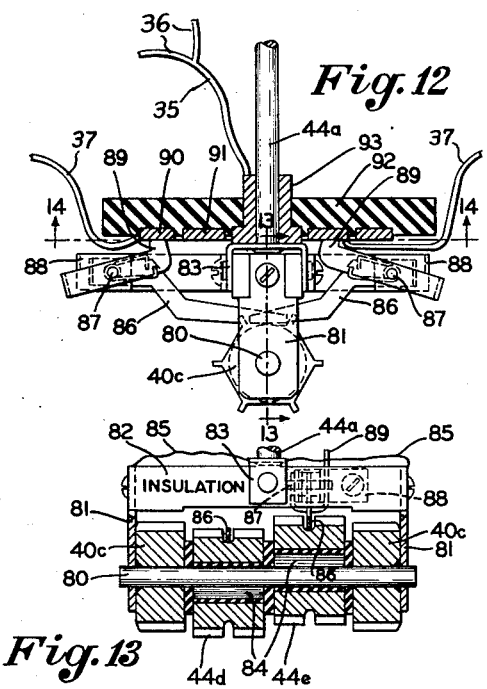
INVENTOR.
Allen Shotwell
BY Frease & Bishop
ATTORNEYS

United States Patent Office 2,768,697
Patented Oct. 30, 1956

2,768,697

REMOTELY CONTROLLED ELECTRICALLY PROPELLED VEHICLE

Allen Shotwell, Elizabeth, Pa.

Application May 20, 1953, Serial No. 356,257

13 Claims. (Cl. 180—2)

This invention relates to electric devices and more particularly to means for remotely controlling an electrically propelled vehicle. While the invention is especially designed for electrically operated toys, it should be understood that it is also applicable to amusement ride devices.

The invention contemplates the provision of a platform or table having two or more sets of conductors thereon, insulated from each other, each set of conductors being located in one side of a control circuit. The vehicle has two or more pickups, one for contacting each set of conductors on the platform and is provided with two motors and a rectifier may be associated with each motor.

Current is furnished to the conductors in the platform through a remote control device having two variable resistances therein. By feeding the output of one resistance to either motor in the vehicle a positive current is controlled, and by feeding the output of the other resistance in the conductor device to one of the motors in the vehicle a negative current is controlled.

Thus, the direction of the travel of the vehicle over the platform is electrically controlled from the remote control device. The resistance may be increased in either polarity circuit, even to a complete "off," thus stopping one motor or the other depending on that polarity, while the opposite polarity resistance being on full keeps the other motor going, thus causing an absolute change in direction of the vehicle.

By operating the remote control device so that there is no resistance in either circuit, both rectifiers carry an equal amount which combines and furnishes an alternating current to the conductors in the platform causing the vehicle to proceed in a straight line.

Other objects of the invention include the provision of a platform or table for a device such as above referred to, which may include a conductor plate of substantially the size of the platform or table, connected to one side of the remote control circuit, and a plurality of equally spaced conductor bars insulated from said conductor plate and from each other and connected to the other side of the control circuit.

A further object is to provide such a platform or table in which two alternate sets of conductor bars may be insulated from each other and from the conductor plate.

A still further object is to provide a platform of the character referred to, formed of a sheet or block of insulation having spaced, parallel grooves with two or more sets of conductor bars being located in alternate grooves.

Another object of the invention is to provide a remotely controlled, electrically propelled vehicle having one or more electric pickups in the form of rotatable toothed wheels adapted to contact the conductor plate or the conductor bars located in grooves of the insulation sheet or plate.

It is also an object of the invention to provide an electrically propelled vehicle having such a toothed wheel pickup, engaging one set of conductors, and a sliding brush pickup for engaging another set of conductors in the platform.

A further object is to provide a vehicle of this character having two motors therein, each motor driving one traction wheel, there being a circuit in the vehicle connecting both motors to both of the electric pickups.

A still further object is to provide an electric remote control device having a circuit, one side of which is connected to each set of conductors in the platform, a variable resistance being provided in the control device for controlling the speed of the vehicle, and a pair of variable resistances being located in the control device circuit and geared to a central control, the output of one resistance being fed into a rectifier to produce a positive current and the output fo the other resistance being fed into a rectifier to produce a negative current.

Figures 2, 4:
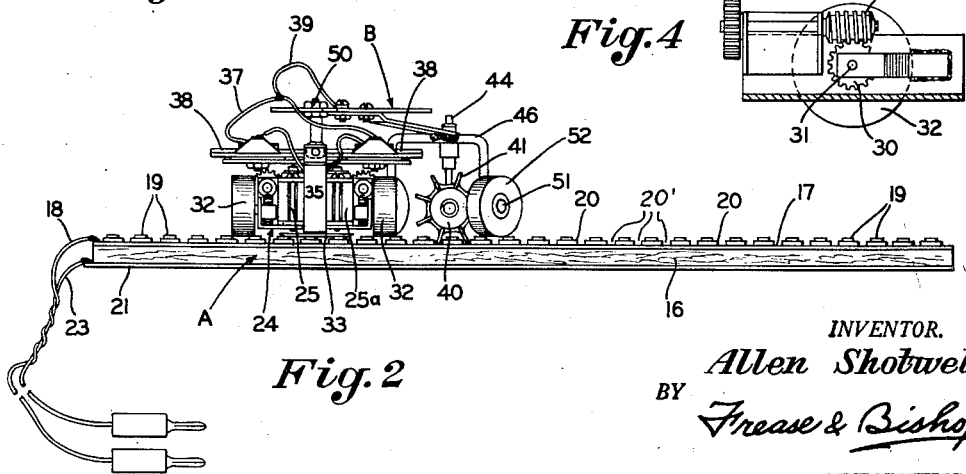

The above and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings, in which:

Fig. 1 is a plan view of a platform or table provided with two sets of conductors connected to opposite sides of the circuit from the remote control device, and showing an electrically propelled vehicle located for movement over the platform;

Fig. 2 an end elevation of the platform shown in Fig. 1, showing the vehicle thereon in elevation;

Fig. 3 an enlarged, fragmentary, sectional view through a portion of the conductor platform and showing an electrically propelled vehicle in section thereon;

Fig. 4 a fragmentary, sectional view showing the gearing for connecting one motor to one of the traction wheels of the vehicle;

Fig. 5 a view similar to Fig. 3, showing a modified form of conductor platform and portions of a modified form of electrically propelled vehicle for use therewith;

Fig. 6 a front elevation of the remote control device;

Fig. 7 a rear elevation of the remote control device with parts broken away for the purpose of illustration;

Fig. 8 a side elevation of a modified form of electrically propelled vehicle made in the form of a military tank with caterpillar tread;

Fig. 9 an enlarged, fragmentary, sectional view through a portion of a modified form of conductor platform;

Fig. 10 a wiring diagram of the circuit in the remote control device;

Fig. 11 a wiring diagram of the circuit in the electrically propelled vehicle;

Fig. 12 a fragmentary, vertical, sectional view through a modified form of electrically propelled vehicle adapted to be operated upon the modified form of platform shown in Fig. 5;

Fig. 13 a fragmentary, sectional view of the modified form of pickup, taken as on the line 13—13, Fig. 12; and, Fig. 14 a fragmentary, sectional view of the collector rings and associated parts, taken as on the line 14—14, Fig. 12.

Referring now more particularly to the embodiments of the invention illustrated in the drawings, in which similar numerals refer to similar parts throughout, first considering the form of the invention shown in Figs. 1, 2, 3, 6, 7, 10 and 11, the device comprises substantially three main units, namely the conductor platform indicated generally at A, the electrically propelled vehicle indicated generally at B and the remote control device indicated generally at C.

In the form of conductor platform or table shown in Figs. 1 to 3, an insulation plate or block 16 is provided, of any desired length and width suitable for providing a table or platform upon which the remotely controlled, electrically propelled vehicle may operate.

It should be understood that, if desired, this platform or table may be made in sections and electrically connected together, in usual and well known manner such as is used for connecting sections of toy electric train tracks together.

A conductor plate 17, of suitable conductor metal, may cover the entire top of the insulation block 16, and one wire 18 is connected to this conductor plate and leads to the remote control device, as will be later described in detail.

A spaced plurality of parallel conductor bars 19 are mounted above the conductor plate 17 and insulated therefrom by parallel strips 20 of insulation material. Each of the conductor bars 19 is connected at one end to a buss bar 21, as by the conductor wires 22 or their equivalent insulated from the conductor plate 17 as indicated at 22a, and a wire 23 is connected to the buss bar 21 and scribed. The spaced, parallel insulation strips 20 thus provide parallel grooves 20' therebetween, through which spaced parallel, relatively narrow, elongated portions of the conductor plate 17 are exposed.

The electrically propelled vehicle, indicated generally at B, includes a frame, indicated generally at 24, within opposite sides of which are mounted two independent induction motors 25 and 25a. The shaft 26 of each motor has a pinion 27 thereon, meshing with a similar pinion 28 upon the shaft of a worm screw 29 which meshes with a worm gear 30 fixed upon the axle 31 of the corresponding traction wheel 32.

The wheels 32 are formed of suitable insulation material, preferably a pliable rubber or the like, so as to insulate the vehicle from the conductors on the platform or table, except for the pickups, as will later be described in detail.

A pickup surface brush 33 is carried on the underside of the vehicle, for contact with the conductor bars 19, and, as shown in the drawings, is preferably pivotally connected as at 34 to the depending end of the spring conductor bar 35 fixed at its other end to the frame of the vehicle and electrically connected to one side of each of the motors 25 and 25a, as indicated at 36.

The other side of each motor is connected by a conductor 37 to one of the rectifiers 38, both of which are connected as at 39 to the toothed wheel pickups 40. These toothed wheels are formed of copper, or other suitable conductor material, and the spaced teeth 41 thereon are arranged to contact the conductor plate 17, between adjacent conductor bars 19 and are so shaped and proportioned that they will not at any time contact the conductor bars 19.

The toothed pickup wheels 40 are both fixed upon an axle 42, journalled in a bolster 43 provided with a king pin 44 journalled in the bearing 45 carried by the yoke 46 which is rigidly connected to the conductor bar 47 fixed to the insulation plate 48 which is swiveled upon the upright post 49 of the main frame 24, as indicated at 50.

The yoke frame 46 is provided with the out-turned terminal ends 51 forming axles for the wheels 52 which are formed of suitable insulation material, preferably of pliable rubber or the like, so as to insulate the yoke frame 46 from the conductor platform or table.

The remote control device, shown in Figs. 6, 7 and 10, comprises a sheet metal housing 53 having a transformer 54 therein adapted to be connected by the flexible, electric cord 55 and connector plug 56 to an alternating current power line.

One side of the secondary coil 57 of the transformer is connected, as by the conductor wire 58, to the movable arm 59 of a rheostat or variable resistance, indicated generally at 60, for controlling the speed of the vehicle. This movable arm is adapted to be rotated by a knob 61 upon the outer side of the housing 53, in order to manually control the speed of the vehicle as it moves over the conductor platform or table.

The coil 62 of the speed controlling rheostat or variable resistance 60 is connected, by a conductor wire 63, to the movable arms 64 and 65 of a pair of rheostats or variable resistances indicated generally at 66 and 67 respectively.

The movable arms 64 and 65 are arranged for rotary movement in contact with the coils 68 and 69 respectively of the rheostats or variable resistances 66 and 67. The movable arms 64 and 65 of these two rheostats or variable resistances are arranged to be alternately geared to one control by means of the gear teeth 70 upon the movable arms 64 and 65 adapted for alternately meshing with the gear sector 71 upon the control shaft 72, arranged for manual operation by the knob 73.

Conductor wires 74 and 75 connect the coils 66 and 67 to the rectifiers 76 and 77 respectively, both of which are connected by wire 18 to one series of conductors on the platform or table, the other wire 23 from the other series of conductors on the table or platform being connected to the secondary coil 57 of the transformer 54.

With the control shaft 72 in the position shown in Fig. 10, there is no resistance in either circuit, and the two rectifiers 76 and 77 each carry an equal amount which combines again and furnishes an alternating current to the conductor on the platform or table causing the vehicle to move in a straight line.

When the control shaft 72 is rotated in either direction it merely exerts increasing resistance in that polarity circuit, even to a complete "off," thus stopping one or the other of the motors 25 or 25a in the vehicle, depending on that polarity. The opposite polarity resistances being full "on" keeps that motor going, thus causing an abrupt change in direction of the vehicle.

It will thus be obvious that by manually manipulating the control shaft 72 the vehicle may be steered in any desired direction over the surface of the platform or table.

In Fig. 8 is shown a modified form of the electrically propelled vehicle, all working parts being the same as in Figs. 1, 2, 3 and 4, and being designated by the same reference characters, the vehicle merely being made to simulate an army tank or other caterpillar tractor device.

In Fig. 5 is shown fragmentarily a modified form of vehicle and table or platform. The platform comprises an insulation sheet or block 16a, having a conductor plate 17a covering the top surface thereof, and two series of conductor bars 19a and 19b, insulated from the conductor plate 17a and from each other as by suitable insulation 20a and 20b.

The conductor bars 19b are connected to the buss bar 21b in the same manner as the conductor bars 19 are connected to the buss bar 21 in Fig. 3, and the conductor bars 19a are similarly connected to the buss bar 21a. Wires 18 and 74 are connected to the conductor plate 20a and to the buss bar 21b in the manner of Fig. 3, and a third wire 75 is connected to the buss bar 21a.

The vehicle is provided with a brush type of pickup 33a for contact with the conductor bars 19b, similar to the surface brush pickup 33 on the vehicle shown in Figs. 1 to 3, and there are two sets of toothed pickup wheels, 40a and 40b, for separate contact with the conductor plate 17a and the conductor bars 19a.

The pick-up wheels 40a and 40b are insulated from the shaft and from each other by insulation indicated at 84a, in a manner similar to the insulation of the wheels in Fig. 13, and each pick-up wheel is separately connected to one of the motors by one of the wires 37.

In Figs. 12, 13 and 14 is shown another modification of the pickup arrangement for a vehicle operating upon a platform or table with three sets of conductors, such as the platform or table shown in Fig. 5. In this modification, there is no surface pickup, such as the brushes 33 or 33a above described, but all pickups are in the form of toothed wheels.

The pickups comprise a pair of toothed wheels 40c, spaced apart and mounted upon a shaft 80 journalled in bracket arms 81 depending from the insulation block 82. A king pin 44a is connected to the central portion of the insulation block 82, as by the bracket 83, and adapted to be connected to the vehicle in the same manner as the king pin 44 shown in Figs. 1, 2 and 3.

A pair of toothed wheels 44d and 44e are mounted between the toothed wheels 40c, being insulated therefrom and from each other and the shaft 80. Each of the toothed wheels 44d and 44e has an enlarged, central opening 84, of considerably greater diameter than the shaft 80, so that they may move vertically relative to the shaft.

The end wheels 40c are electrically connected to the pivot post or king pin 44a as by bushing 93 and conductors 85. These toothed wheels 40c may ride upon the upper conductor bars 19b as in Fig. 5.

One of the toothed wheels 44d is adapted to contact the conductor plate 17a and the other the conductor bars 19a in a platform or table as shown in Fig. 5.

Spring loaded pickup arms 86 are pivoted as at 87 in brackets 88 and cooperate with spring loaded collector levers 89 engaging the collector rings 90 and 91 carried in the insulation block 92 through which the king pin 44a is journalled, as by the bushing 93.

The king pin 44a is connected to one side of each motor by wires 36. Each of the toothed wheels 44d and 44e is connected to the other side of each motor through the corresponding pick-up arm 86, collector ring 90 or 91 and wire 37.

In Fig. 9 is shown a modified form of platform or track, comprising an insulation plate or block 16c having spaced ribs 94 on its upper surface between which are located alternate conductor bars 95 and 96, one series of which is connected to a wire, such as the wire 18 of Fig. 3 leading to the remote control device, the other series of conductor bars being connected to a wire such as the wire 23 of Fig. 3, leading to the remote control device.

A pair of toothed pickup wheels, such as the wheels 40a and 40b of Fig. 5 or the wheels 44d or 44e of Fig. 13, may be provided upon the vehicle, one of these toothed wheels contacting each series of conductor bars. It should be understood of course that in such a modification no surface pickup brush is required, as one pick-up wheel may be connected to one side of the motors, as by the wires 37, and the other pick-up wheel may be connected to the other side of the motors, as by the wires 36.

The upstanding insulation ribs 94 will maintain the traction wheels of the vehicle out of contact with the conductor bars 95 and 96, which are located in the grooves between the insulation ribs 94, so that in this case it is not necessary that the traction wheels on the vehicle be formed of insulation material or be otherwise insulated. Rectifiers may be required in the vehicle, or in the control means, for use in connection with the track or platform of Fig. 9.

From the above it will be obvious that a very ingenious, remotely controlled vehicle is provided, in which the vehicle may be caused to move at any desired speed, and in any direction, over the platform or table, being caused to turn at will, or to move straight ahead, and to vary its speed by manual operation of the control knobs 61 and 73 of the remote control device.

It should be understood that where a two wire pickup is used, rectifiers may be required in the vehicle and/or the control means, but in cases where a three wire pickup is provided such as in Fig. 5, and in Figs. 12 to 14 inclusive, with alternating current motors in the vehicle, no rectifiers are necessary in the vehicle or in the control.

Although the invention is disclosed as embodied in a toy vehicle, it should be understood that it is equally well adapted for use in amusement ride devices and the like.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details disclosed.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. The combination of a platform having two series of spaced parallel conductors thereon, there being parallel grooves in the platform in which at least one series of the conductors is located, an electrically propelled vehicle adapted for movement over the platform, electric motor means on the vehicle, a traction wheel operatively connected to the motor means, electric pickup means on the vehicle for contact with each series of conductors, said pickup means being electrically connected to the motor means, one of said pickup means comprising a toothed wheel contacting one series of conductors in said grooves, and an electric circuit connected to said conductors.

2. Apparatus as specified in claim 1, in which both series of conductors are located in the grooves and in which the pickup means comprises two toothed wheels one of which contacts each series of conductors.

3. Apparatus as specified in claim 1, in which the electric motor means comprises two motors with a traction wheel operatively connected to each motor, and a rectifier electrically connected to each motor and to each pickup means and adapted to pass current of opposite polarities to the motors respectively, and in which the circuit is an alternating current remote control circuit having means therein for independently operating each motor.

4. Apparatus as specified in claim 3, in which both series of conductors are located in the grooves and in which the pickup means comprises two toothed wheels one of which contacts each series of conductors.

5. Apparatus as specified in claim 1, in which the other pickup means comprises a surface contact brush contacting the other series of conductors.

6. Apparatus as specified in claim 1, in which a third series of conductors is located on the platform, and in which the electric motor means comprises two motors with a traction wheel operatively connected to each motor, and in which means is provided in the circuit for independently operating each motor.

7. Apparatus as specified in claim 3, in which the means for independently operating each motor includes a pair of rheostats located in parallel in the circuit.

8. Apparatus as specified in claim 6, in which the means for independently operating each motor includes a pair of rheostats located in parallel in the circuit.

9. Apparatus as specified in claim 7, having means for operating said rheostats in succession.

10. Apparatus as specified in claim 8, having means for operating said rheostats in succession.

11. Apparatus as specified in claim 3, having a variable resistance in the remote control circuit for controlling the speed of the motors.

12. Apparatus as specified in claim 6, having a variable resistance in the circuit for controlling the speed of the motors.

13. Apparatus as specified in claim 6, in which two series of the conductors are located in the grooves and in which the pickup means includes two toothed wheels each contacting one series of conductors in the grooves.

References Cited in the file of this patent

UNITED STATES PATENTS

| | | |
|---|---|---|
| 1,587,083 | Neuzerling | June 1, 1926 |
| 2,244,528 | Schur | June 3, 1941 |
| 2,488,464 | Arpin | Nov. 15, 1949 |

FOREIGN PATENTS

| | | |
|---|---|---|
| 707,408 | France | Apr. 14, 1931 |
| 821,619 | France | Aug. 30, 1937 |